(No Model.)

J. PHILLIPS
BEE HIVE.

No. 264,898. Patented Sept. 26, 1882.

WITNESSES:
Fred. G. Dieterich.
Jno. W. Stockett.

INVENTOR.
John Phillips
by C. A. Snow & Co.
ATTORNEYS.

UNITED STATES PATENT OFFICE.

JOHN PHILLIPS, OF RILEY'S STATION, KENTUCKY.

BEE-HIVE.

SPECIFICATION forming part of Letters Patent No. 264,898, dated September 26, 1882.

Application filed June 20, 1882. (No model.)

*To all whom it may concern:*

Be it known that I, JOHN PHILLIPS, of Riley's Station, in the county of Marion and State of Kentucky, have invented certain new and useful Improvements in Bee-Hives; and I do hereby declare that the following is a full, clear, and exact description of the invention, which will enable others skilled in the art to which it appertains to make and use the same, reference being had to the accompanying drawings, which form a part of this specification.

Figure 1:
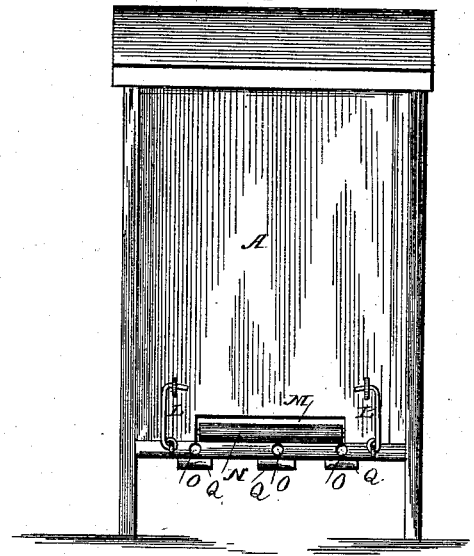
Figure 2:
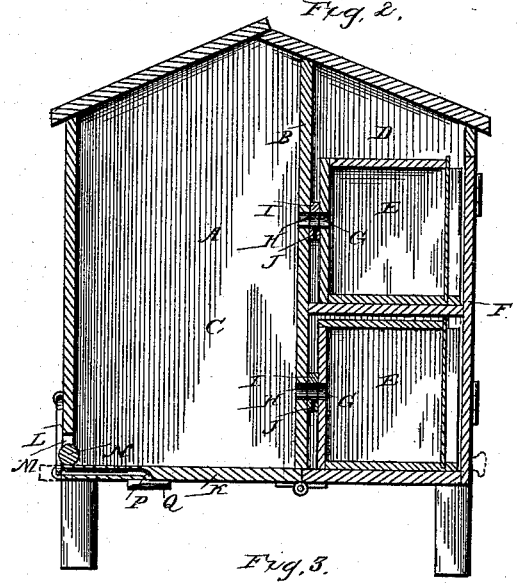
Figure 3:
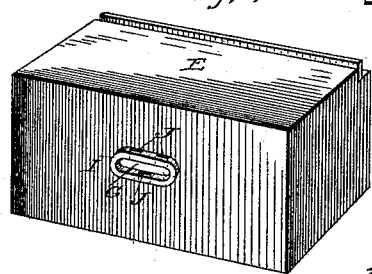

Figure 1 is a side view, Fig. 2 is a vertical sectional view, and Fig. 3 is a detail view, of one of the honey-boxes.

Corresponding parts in the several figures are denoted by like letters of reference.

This invention relates to bee-hives; and it consists in certain improvements in the construction of the same which will be hereinafter fully described, and particularly pointed out in the claims.

In the drawings hereto annexed, A represents the hive-box, which is divided by a vertical wall, B, into two compartments, C D. The former contains the comb-frames, which, however, are not shown in the drawings.

In the compartment D are placed the honey-boxes E, to which access is gained by a door, F.

Openings G in the sides of the honey-boxes register with openings H in the wall B, through which the bees gain admission to the honey-boxes. The openings G of the latter are surrounded by raised flanges or moldings I, so that when the boxes are placed or pushed into the hive the bees shall not be crushed or injured. The flange I is provided with one or more notches or slots, J, so that any bees which may be caught between the end of the honey-box and the wall B may crawl back through said slots to the openings G H.

The bottom K of the chamber C is hinged to that of chamber D, and is capable of being let down, so as to provide for the thorough ventilation of the hive. When closed the hinged bottom may be secured by hooks L or in any other suitable manner.

In the side of the hive, just above the free end of the hinged bottom, is formed a slot, M, between the ends of which is journaled a roller, N, which just touches the bottom, while above it an opening is left of sufficient size to form the bee-entrance. The object of the roller is to keep out moths, which are always deposited under it or in corresponding places. By turning the roller over once or twice a week the moths may be readily removed and destroyed.

The end of the hinged bottom K is provided just below the bee-entrance with one or more horizontal openings or apertures, O, the inner ends of which open downwardly, as at P. Suitably-constructed traps Q may be placed under the openings P to catch any intruding insects, which will generally attempt to enter the hive through the apertures O.

In addition to being moth and insect proof, my improved hive has the advantage of being easily and thoroughly ventilated. The honey-boxes are conveniently arranged and may be removed without disturbing the bees.

The bottom K may extend in front of the bee-entrance, as shown in dotted lines, Fig. 2, to form a ledge on which the bees may alight.

Having thus described my invention, I claim and desire to secure by Letters Patent of the United States—

1. In a bee-hive, the box A, having dividing-wall B, door F, hinged bottom K, slot M, and roller N, journaled in the ends of said slot in contact with the free end of the hinged bottom, as set forth.

2. In a bee-hive, the partition-wall B, having openings H, in combination with the honey-boxes E, having openings G, surrounded by flanges I, having slots or notches J, as set forth.

In testimony that I claim the foregoing as my own I have hereto affixed my signature in presence of two witnesses.

JOHN PHILLIPS.

Witnesses:
W. A. BAXTER,
W. G. WHITEHOUSE.